US006902332B2

(12) United States Patent
McLoone

(10) Patent No.: US 6,902,332 B2
(45) Date of Patent: Jun. 7, 2005

(54) UNIVERSAL REMOTE COMPUTER KEYBOARD

(75) Inventor: Hugh E. McLoone, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/631,245

(22) Filed: Jul. 31, 2003

(65) Prior Publication Data

US 2005/0025550 A1   Feb. 3, 2005

(51) Int. Cl.$^7$ ............................................. G06F 3/23
(52) U.S. Cl. ......................................... 400/472; 341/22
(58) Field of Search ........................... 400/472, 486; 341/22; 345/168, 169; 361/68

(56) References Cited

U.S. PATENT DOCUMENTS

| | | | |
|---|---|---|---|
| 5,049,863 A * | 9/1991 | Oka | 345/168 |
| 5,574,481 A * | 11/1996 | Lee | 345/168 |
| 6,384,737 B1 | 5/2002 | Hsu et al. | |
| 6,549,143 B1 | 4/2003 | O'Donnell et al. | |
| 6,593,859 B1 * | 7/2003 | Watanabe | 341/20 |
| 2001/0028311 A1 * | 10/2001 | Kumar | 340/825.56 |
| 2002/0091877 A1 * | 7/2002 | Karidis | 710/1 |
| 2002/0173339 A1 * | 11/2002 | Safadi | 455/553 |
| 2004/0056984 A1 * | 3/2004 | Hayes et al. | 348/734 |
| 2004/0155791 A1 * | 8/2004 | Nguyen et al. | 340/825.69 |

FOREIGN PATENT DOCUMENTS

| | | | | |
|---|---|---|---|---|
| JP | 10207605 A | * | 8/1998 | G06F 3/02 |
| JP | 10326141 A | * | 12/1998 | G06F 3/02 |
| JP | 11312044 A | * | 11/1999 | G06F 3/02 |
| JP | 2001318753 A | * | 11/2001 | G06F 3/02 |
| JP | 2003108293 A | * | 4/2003 | G06F 3/02 |
| WO | WO 9921077 A1 | * | 4/1999 | G06F 3/023 |

OTHER PUBLICATIONS

Machine translation of JP 10207605 to Kato from Japanese Patent Office website.*
Machine translation of JP 2001-318753 to Yamamoto from Japanese Patent Office website.*

* cited by examiner

Primary Examiner—Daniel J. Colilla
(74) Attorney, Agent, or Firm—Banner & Witcoff, Ltd.

(57) ABSTRACT

A computer keyboard is configured for navigation of a graphical user interface of a host computer. A keyboard includes a keyboard processor enclosed within a keyboard housing. The keyboard includes a remote control portion which laterally disposed from an alphanumeric section and having a set of keys for being in electrical communication with the keyboard processor. The remote control portion can be removably coupleable with the keyboard housing. A keyboard housing may include a receiving portion which is adapted to receive a remote control body therein.

11 Claims, 11 Drawing Sheets

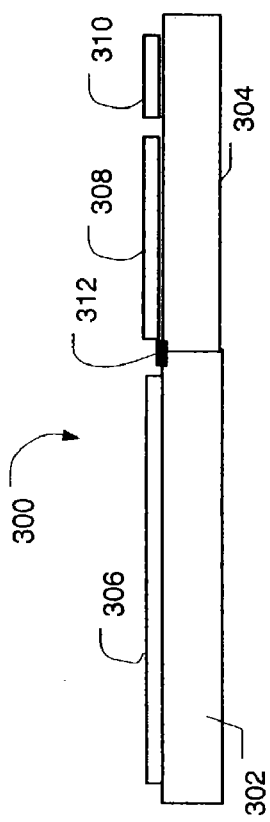
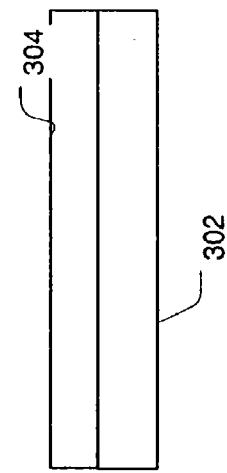
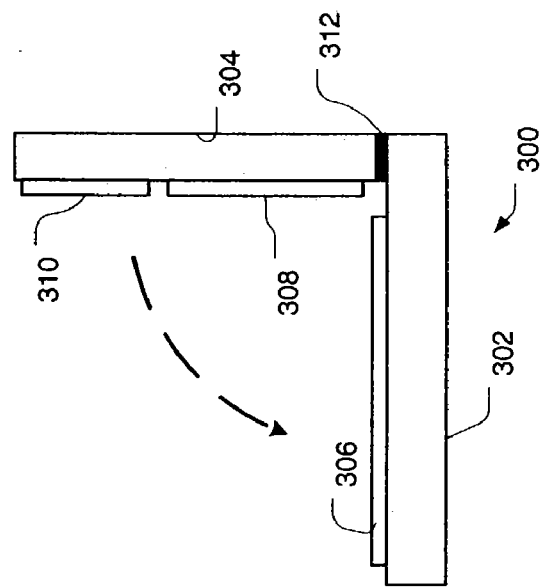

UNIVERSAL REMOTE COMPUTER KEYBOARD

FIELD OF THE INVENTION

The present invention relates to a computer keyboard. More particularly, the present invention relates to a wireless keyboard that includes input devices for control of multiple devices and a graphical user interface.

BACKGROUND OF THE INVENTION

Conventional computer systems, especially computer systems using graphical user interface (GUI) systems, accept user input from a conventional input device, such as a keyboard for entering text, and a pointing device, such as a mouse for operating the graphical user interface.

A traditional notion of user interaction is generally in front of a desktop computer or at least sitting within close viewing proximity to a display screen as with laptop computers. Conventional systems are problematic in meeting the challenge of user interaction for new media. The evolution of new media models of computing, such as digital television, digital music, digital movies, have changed the traditional view of the GUI, and the manner in which users can interact with their computers. In one example of a home theater environment, users may be sitting at couch at a distance away from a display screen. At one time, the users may want to manipulate a GUI to obtain and watch live TV or recorded TV, digital home movies and picture slideshows, or watch DVDs movies. In this "lap-use" or "couch-use" environment, a traditional notion of desktop user interaction can be inefficient and frustrating for many individuals. Thus, the users do not realize the full benefits of experiencing new media computing and productivity software.

While the user may attempt to employ a traditional handheld remote control, it provides limited cursor control, if any, for other computing tasks. At another time, users may want to switch to productivity activities, but may find it awkward and inefficient to attempt to use a traditional remote control for entering text, using electronic spreadsheets, creating documents and other productivity tasks. Some traditional remotes have keys similar to telephone number pads. These types of number pads require a user to spend several steps to generate a text character with the user's thumb. This process of entering text is commonly called "thumbing". In this process, the muscles of the thumb can become very fatigued over extended periods of time. Thus, it can be very difficult and inefficient for some people attempting to enter text, to use electronic spreadsheets, to create documents and other productively tasks with traditional remotes. In a "lap-use" or "couch-use" environment, the user can also waste time and delay the use of their entertainment. These delays can cause the user great frustration and unnecessary stress that is magnified when he or she want to see or hear a specific entertainment program.

Thus, what is needed is an apparatus and method to support user interaction for an untethered environment with a keyboard for manipulating the GUI for the new media technologies and productivity activities, such as creation and modification of electronic documents, spreadsheets, database fields, drawings, photos and the like.

SUMMARY OF THE INVENTION

The present invention pertains to a computer keyboard configured for navigation of a graphical user interface of a host computer and a remote control function.

In one aspect, the keyboard includes a keyboard processor enclosed within a keyboard housing. The keyboard further includes a remote control portion which laterally disposed from an alphanumeric section and having a set of keys for being in electrical communication with the keyboard processor. In another aspect, the remote control portion is removably coupleable with the keyboard housing.

In one aspect, a computer keyboard includes a group of alphanumeric keys and a keyboard housing which is adapted to maintain the group of alphanumeric keys accessible for user interaction. In a further aspect, the keyboard housing has a receiving portion which is adapted to receive a remote control body therein.

In yet another aspect, a wireless remote control is configured for controlling electrical equipment via a wireless connection. The remote control is operatively adapted to a connect to a control circuitry of the remote control and to a host device. In this configuration, data which is generated by the keys are sent to the host device via a hardwired connection. In one aspect, the host device is a wireless keyboard.

In another aspect a wireless remote control is programmed to control electrical equipment via a wireless connection. The remote control has a control circuitry for processing input and a plurality of keys which are operatively connected to the control circuitry. A remote control body or housing is configured to enclose the control circuitry and the body or housing including a protrusion portion which is adapted to removably couple with a host device. In one aspect, the host device is a wireless keyboard.

In yet another aspect, a wireless keyboard system includes a keyboard housing and a keyboard processor disposed within the housing. A remote control body is adapted to be in an abutment relationship within the keyboard housing. The remote control body encloses a remote control processor.

Thus, aspects and features of the present invention enable users to enjoy experiences of rich digital media and gaming with a computer system and surf the Internet, send and receive e-mail messages or Instant Messaging, operate spreadsheets, create documents and presentations with ease of operation in a new media environment.

The above and other aspects, features and advantages of the present invention will be readily apparent and fully understood from the following detailed description illustrative embodiments in conjunction with the accompanying drawings, which are included by way of example, and not by way of limitation with regard to the claimed invention.

BRIEF DESCRIPTION OF THE DRAWINGS

FIGS. 11A-11C are schematic diagrams of a keyboard which operates with the remote control of FIG. 4 according to an embodiment of the present invention

DETAILED DESCRIPTION OF THE INVENTION

Illustrative Operating Environment

A wireless computer keyboard includes a keyboard processor enclosed within a keyboard housing. In an embodiment of the present invention, the computer keyboard includes universal remote control functionality. Various aspects of the present invention may at least be described in the general context of apparatus and computer-executable instructions, such as program modules, executed by one or more computers or other devices. Accordingly, it may be helpful to briefly discuss the components and operation of a general purpose computing environment on which various aspects of the present invention may be implemented. Host computer system can be used for processing data new media technology environment. Such an illustrative host computer system is illustrated in FIG. 1.

Figure 1:
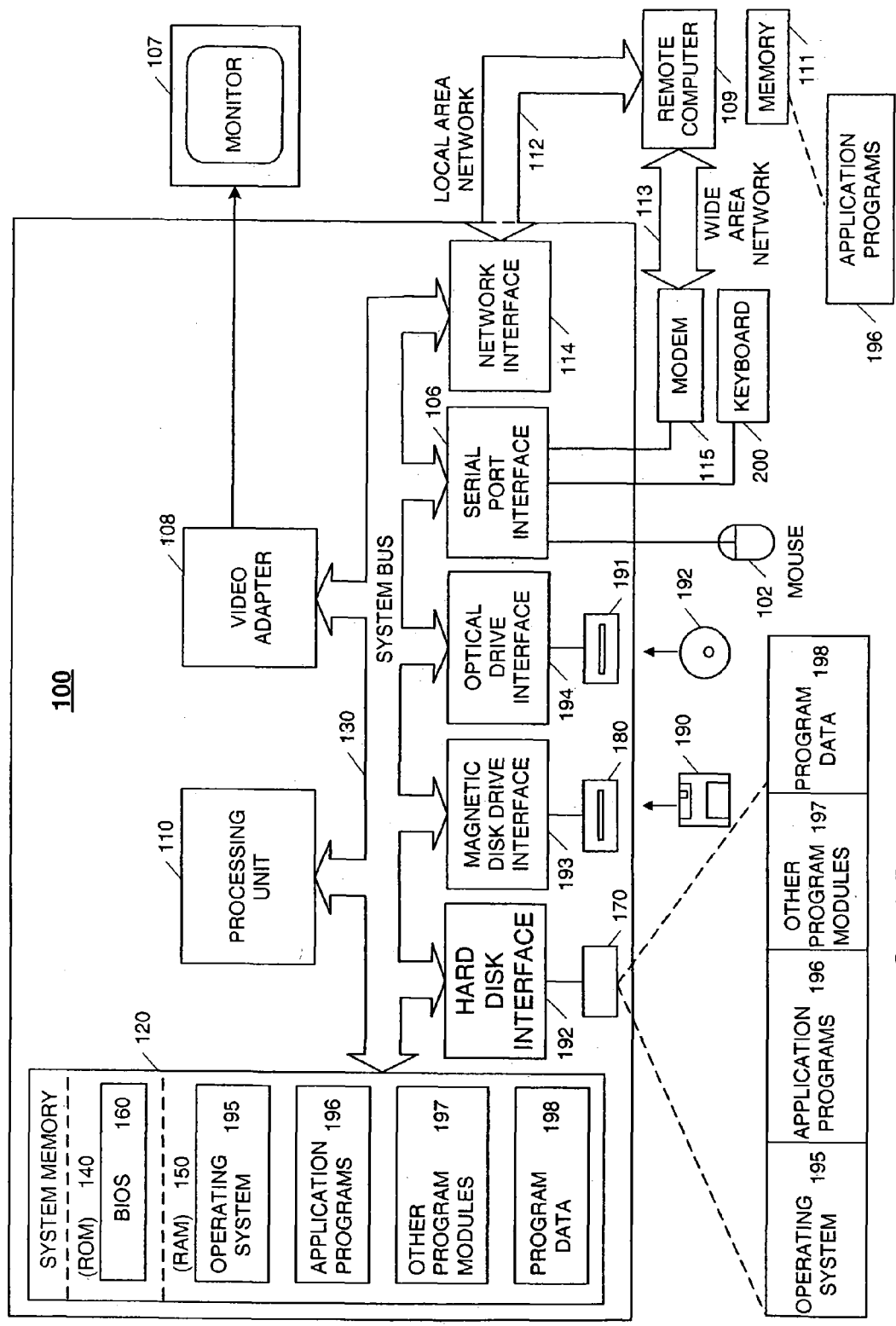
FIG. 1 is a functional block diagram of an illustrative general-purpose digital computing environment in which one or more aspects of the present invention may be implemented.

Accordingly, FIG. 1 illustrates a schematic diagram of an illustrative general-purpose digital computing environment that may be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192, such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules, and other data for the personal computer 100. It will be appreciated by those skilled in the art that other types of computer readable media that may store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules may be stored on the hard disk drive 170, magnetic disk 190, optical disk 192, ROM 140, or RAM 150, including an operating system 195, one or more application programs 196, other program modules 197, and program data 198. A user may enter commands and information into the computer 100 through input devices, such as a keyboard 200 and a pointing device 102. Other input devices (not shown) may include a microphone, joystick, game pad, satellite dish, scanner, or the like. These and other input devices often are connected to the processing unit 110 through a serial port interface 106 that is coupled to the system bus 130, but may be connected by other interfaces, such as a parallel port, game port, or a universal serial bus (USB). Further still, these devices may be coupled directly to the system bus 130 via an appropriate interface (not shown). A monitor 107 or other type of display device with a display screen is also connected to the system bus 130 via an interface, such as a video adapter 108.

The computer 100 may operate in a networked environment using logical connections to one or more remote computers, such as a remote computer 109. The remote computer 109 may be a server, a router, a network PC, a peer device, or other common network node, and may include many or all of the elements described above relative to the computer 100, although only a memory storage device 111 with related applications programs 196 have been illustrated in FIG. 1. The logical connections depicted in FIG. 1 include a local area network (LAN) 112 and a wide area network (WAN) 113. Such networking environments are commonplace in offices, enterprise-wide computer networks, intranets, and the Internet.

When used in a LAN networking environment, the computer 100 is connected to the local network 112 through a network interface or adapter 114. When used in a WAN networking environment, the personal computer 100 typically includes a modem 115 or other means for establishing a communications link over the wide area network 113, e.g., to the Internet. The modem 115, which may be internal or external, is connected to the system bus 130 via the serial port interface 106. In a networked environment, program modules depicted relative to the personal computer 100, or portions thereof, may be stored in a remote memory storage device.

It will be appreciated that the network connections shown are exemplary and other techniques for establishing a communications link between the computers may be used. The existence of any of various well-known protocols such as TCP/IP, Ethernet, FTP, HTTP and the like is presumed, and the system may be operated in a client-server configuration to permit a user to retrieve web pages from a web-based server. Any of various conventional web browsers may be used to display and manipulate data on web pages.

Illustrative Keyboard Environment

Figure 2:
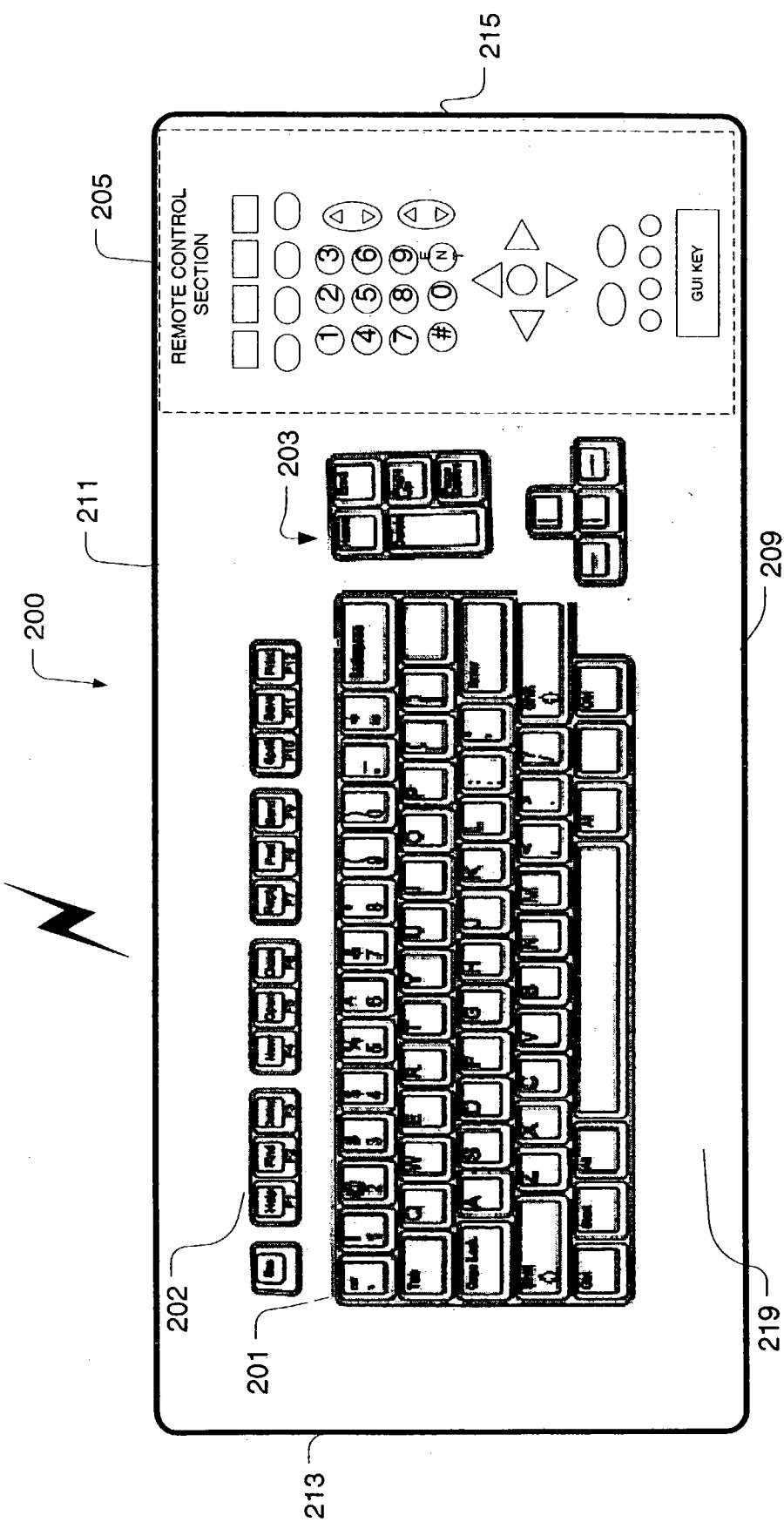
FIG. 2 is a schematic representation of a keyboard according to one embodiment of the present invention.

Keyboard arrangements in accordance with one or more aspects of the present invention are shown in FIGS. 2–10 and 11A–11C. Referring to FIG. 2, keyboard 200 includes an alphanumeric section 201, an editing section 203, and a remote control section 205. For reference purposes, the keyboard 200 has a front edge 209 adjacent the user during normal use, and a back edge 211 distal from the user during normal use. Accordingly, an object is said herein to be "behind" another object when it is between that object and the back edge 211. An object is said herein to be "directly behind" another object when it is between that object and the back edge 211 and at least partially located within the lateral bounds of that object extending in the front-to-back direction. An object is said herein to be "in front of" another object when it is between that object and the front edge 209. Further, the keyboard 200 also a left edge 213 and a right edge 215. The direction "lateral" defines the general directions from the left edge 213 to the right edge 215 and from the right edge 215 to the left edge 213. A "key cluster" is defined as a group of keys, each of which is immediately adjacent, or in close proximity, to adjacent keys within the cluster and set apart from other keys on the keyboard by a distance larger than the spacing between the adjacent keys in the cluster.

The alphanumeric section 201, sometimes referred to as the QWERTY section, includes keys for each of the letters of the alphabet, each of the digits 0–9, and various punctuation symbols. The editing section 203, preferably located immediately to the right and left of the alphanumeric section 201, preferably includes four cursor control arrow keys, and Delete, Insert, Home, End, PageUp, and PageDown keys. If desired, the keyboard 200 may include a numeric section.

Figure 3:
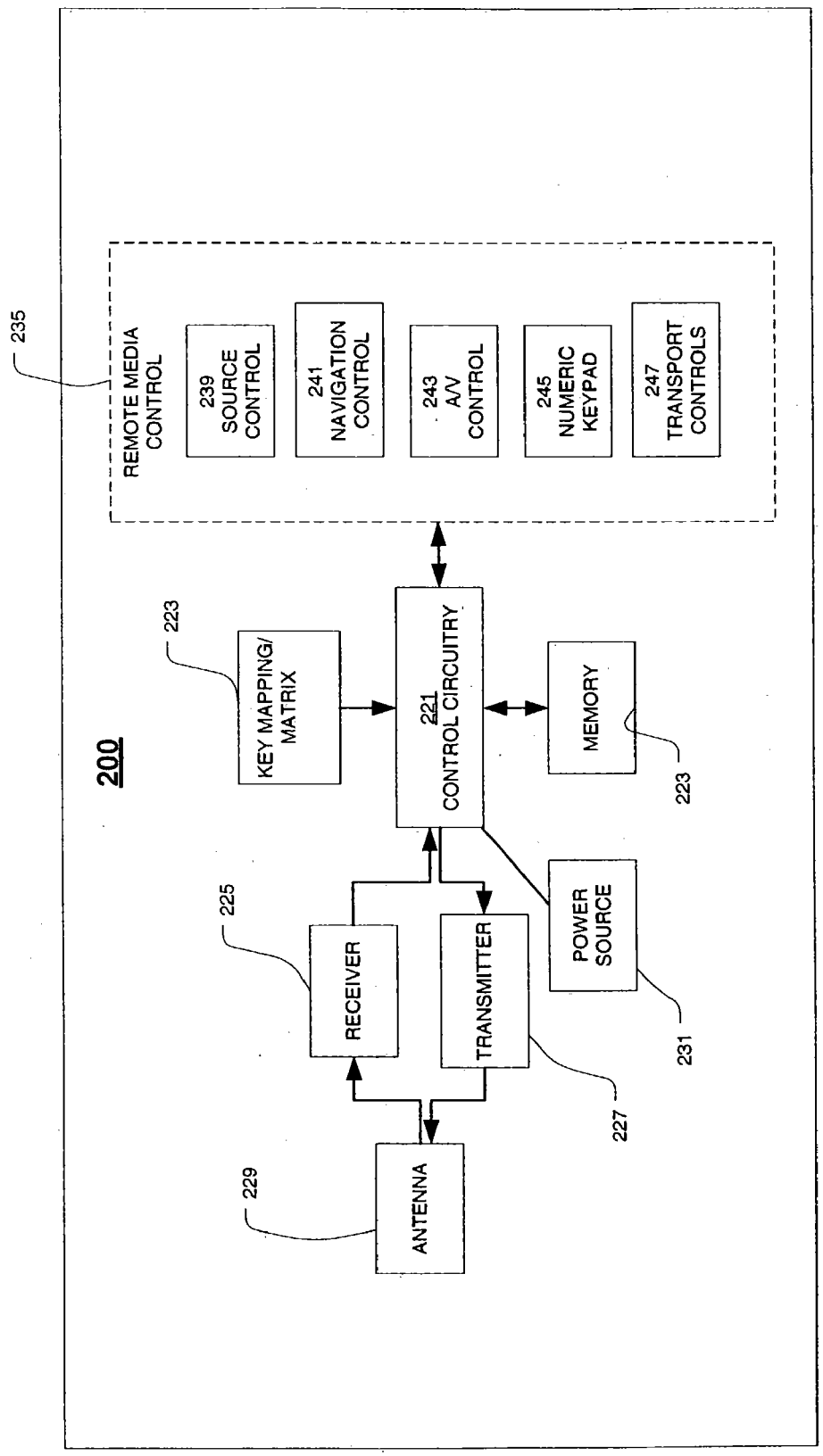
FIG. 3 is a functional block diagram of the keyboard shown in FIG. 2 according to an embodiment of the present invention.

Referring to FIGS. 2–10, an embodiment of the present invention includes a keyboard 200 with universal remote control functionality. Turning to FIG. 3, keyboard 200 transmits data to the host computer 100 via a wireless connection. The wireless connection arrangement provides the user with untethered freedom to use the keyboard 200 in a new media environment. The keyboard 200 may include electronic components and software such as, a control circuitry 221, a memory 223, a receiver 225, a transmitter 227, an antenna 229, electric power source 231, and key mapping/matrix 233, and a remote media control input 235 for universal remote control functions. The electric power source 231 provides the electric power to operate the keyboard 200 components and other functions. In one preferable arrangement, electric power source 231 may be embodied as a battery electrically connected to the various components of the keyboard 200. A keyboard housing 219 encloses the aforementioned internal components of the keyboard 200, such as the control circuitry 221, the memory 223, the receiver 225, and the transmitter 227. It should be recognized that keyboard housing 219 may be formed of various shapes and of suitable plastic materials. The housing 219 can be molded or otherwise formed with conventional manufacturing methods.

Keyboard 200 includes hardware and software that provides for the keyboard to recognize which key is activated in the key mapping/matrix 223 and processes electrical input from the remote media control input 235. The control circuitry 221 includes one or more microprocessors (not shown) as known in the art for operating on electrical input. Control circuitry 221 is operatively connected to receiver 225, transmitter 227, memory 223, and remote media control input 235. The memory 223 may be any programmable type in which nonvolatile storage can be electrically erased and reprogrammed. Possible alternatives include flash memory, flash ROM, RAM with battery backup from electric power source 231.

It should be recognized that the terms "transmitter", "receiver" and "antenna" are used for ease of explanation in that there they may embodied in many different alternatives. For example, transmitter and receiver can be embodied as a transreceiver or a bi-direction communication data port, such as with infrared communications. Antenna can be embodied for receiving or sending radio frequencies. Alternatively, antenna can be embodied as a lens for infrared communication. Turning to FIG. 3, receiver 225, transmitter 227 and antenna 229 provide a function of allowing the keyboard 200 to connect wirelessly to the host computer 100 at a proximate distance. An operable distance is approximately three feet to eighteen feet between and keyboard 200 and host computer 100. The operable distance can vary depending on a number of factors to include signal strength, obstructions in the transmission path, battery power, and the like. The receiver 225 is operatively coupled to the antenna 229 for receiving a wireless communication transmission including keystroke data, such as key scan codes or other data. The transmitter 227 is also operatively coupled to the antenna 229 for sending a wireless communication transmission or message, such key scan codes or other data.

It should be recognized that host computer 100 includes a receiver and a transmitter (or a transceiver) operatively coupled to the processing unit 110 via the system bus or serial connection. The wireless connection may include infrared frequencies or radio-controlled frequencies. One type of wireless connection may be the widely available communication standards such as, the Infrared Data Association ("IrDA") specification and protocols, such as IrDA Data or IrDA Control. The IrDA communication protocols provides low-cost, short-range, cross-platform, point-to-point communications at various transfer rates for devices employing the standardize protocol. There are various suppliers of IrDA compatible hardware for transceivers and interfacing software modules. Nevertheless, the wireless connection may radio frequency based. The radio-controlled configuration may include a transmitter 227 and receiver 225 operating at 49 MHz, but other alternative frequencies may be implemented. Further, it is contemplated that keyboard 200 may have Wi-Fi capability such that it can be communicate via a wireless network using 802.11b protocol to host computer 100. Nevertheless, any appropriate wireless transmission protocol or wireless medium arrangement can be employed to connect keyboard 200 to host computer 100 for operation.

With continued reference to FIG. 3, remote media control input 235 comprises a plurality of control functions for operating media technology and entertainment equipment. Remote media control input 235 includes a source control input 239 configured to select sources of audio or video to be provided to host computer 100 for processing and output to a user. Navigation control 241 is configured to provide movement of a user interface on host computer 100. Navigation control 241 may include functions such as "Left", "Right", "Up", "Down", "Back." A/V control 243 provides for controls of volume and channels or stations for television or radio operation. Numeric keypad 245 provides for numeric values associated with equipment and channels or stations. Transport control 247 is configured for playback of media, such as digital video disks, musical compact disc, slide shows, digital video recorder, and other media. For example, some of the functions of transport control 247 may include "Play", "Pause", "Stop", "Record", "Skip", and "Forward". Other similar functions are possible. It should be recognized that keyboard 200 includes keys or buttons associated with the functions in remote media control input 235. Such keys or buttons may be mechanically depressible or electronic activated, such as touch display surface with associatively linked sensitive keys.

Figure 4:
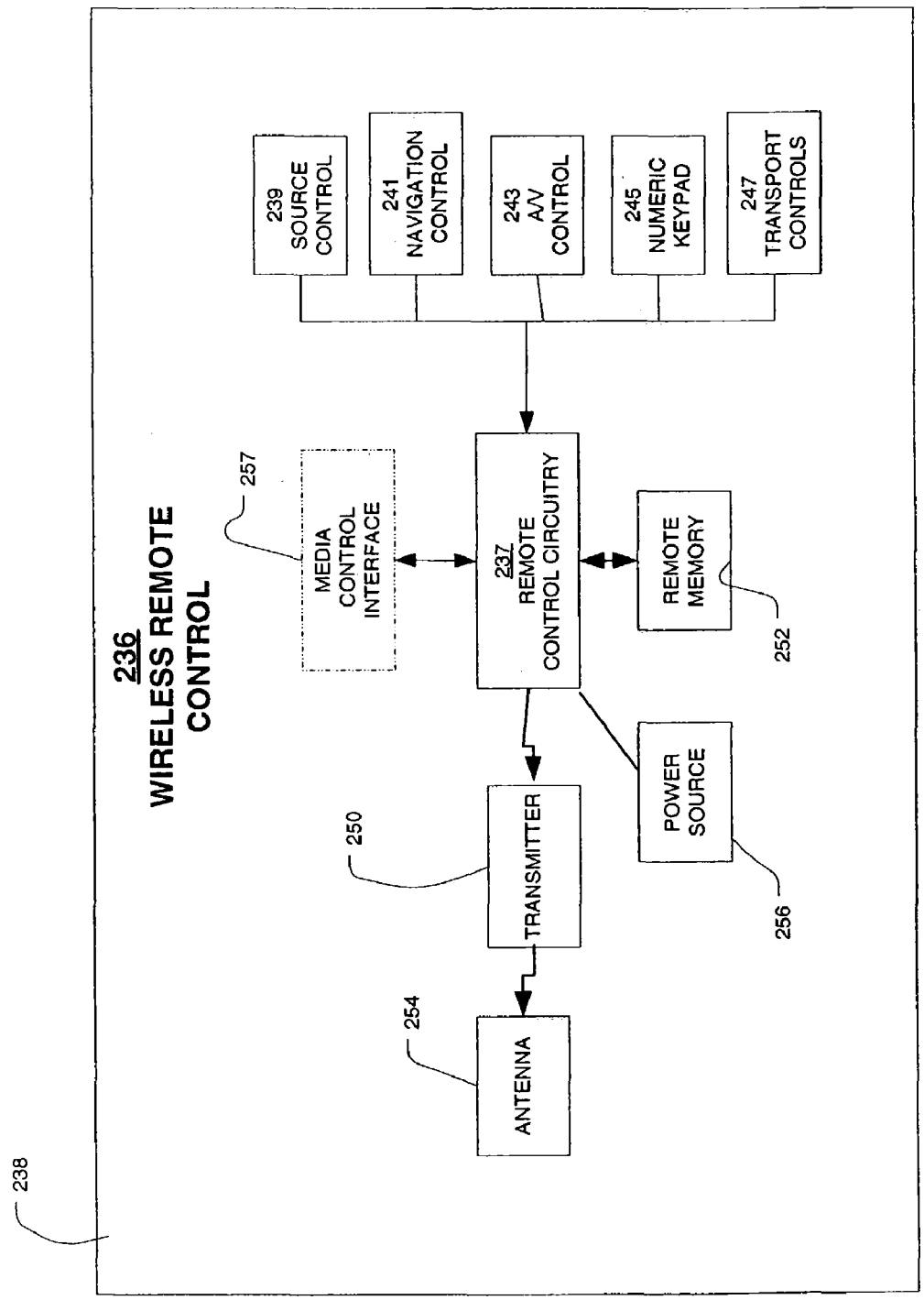
FIG. 4 is a functional block diagram of remote control according to an embodiment of the present invention.
Figure 9:
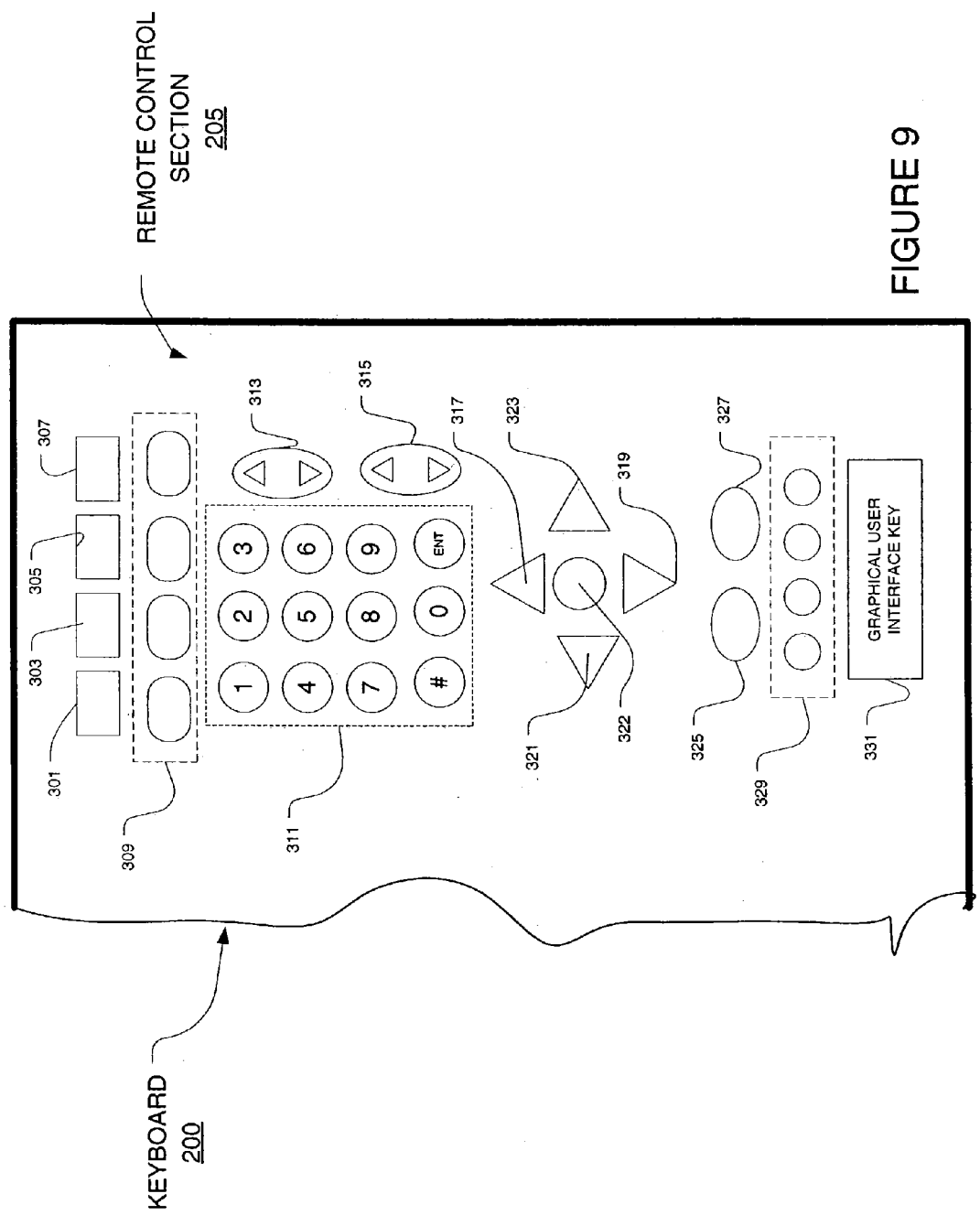
FIG. 9 is an enlarged view of a remote control section of the keyboard shown in FIG. 2.

In one example of a key or button configuration, FIG. 9 shows a remote control section of keyboard 200 according to one or more aspects of the present invention. Referring to FIGS. 4 and 9, remote control section 205 includes that a plurality of keys or buttons associated with Source control 239, Navigation control 241, A/V Control 243, Numeric keypad 245, and Transport control 247 (shown in FIG. 3). Keys 300–307 are electrically linked to Source control 239. In one arrangement, key 301 may be linked to provide a television audio source. Key 303 may be linked to provide a satellite TV audio source. Key 305 may be linked to provide an optical disk audio source. Key 307 may provide a cable television audio source. A set of keys designated in a key cluster 309 may be used to set the keyboard 200' to control a different electronic equipment other than host computer 100'. This type of controllability provides audio source or video input which is fed into host computer 100' and operable control of functions of the electronic equipment. For example, keyboard 200 with remote control section 205 can control many different devices, such as televisions, digital video disk players, digital video recorders, satellite receivers, audio compact disk players, surround sound audio and video systems and the like. In operation, control circuitry 221 of keyboard 200 is programmed to selectively address different electronic devices for control, when a key of key cluster 309 is depressed. Continuing with FIGS. 4 and 9, a key cluster 311 includes a set of keys linked to numeric keypad 245. The key cluster 311 contains Digit 0–9 and a pound key # and Enter "ENT" key. The Digit 0–9 keys, pound key # and Enter "ENT" key are organized in a three-by-four array. Nevertheless, other arrangements are possible.

With continued reference to FIGS. 4 and 9, remote section 205 may include a set of keys, pivotable key 313 and key 315 which provide control of volume and channels; or stations for television or radio operation. These keys 313 and 315 are operatively linked to A/V control 243. A set of keys or key cluster, e.g. keys 317–323 functions to provide navigation control. "Up" key 317; "Down" key 319; "Left" key 321; and "Right" key 323 provide movement of an image in the respective direction on monitor 107. Key 322 is configured to invoke an "Enter" command to the operating software of application program running on host computer 100. A key 325 and key 327 function to control operation of a digital video disk player, audio compact disk player, a digital video recorded and the like. A key cluster 329 can provide operational functions such as "Play", "Pause", "Stop", "Record", and "Skip." Other similar functions are possible. These keys of key cluster 329 are operatively linked to transport control 247. Key 331 provides functions to invoke operation of a graphical user interface of host computer 100. It is contemplated that other key arrangement and functions are possible in remote control section 205 to control electronic devices.

Illustrative Remote Control Environment

Shown schematically in FIG. 4 is a functional block diagram of a separate remote control environment according to one or more aspects of the present invention. With continued reference to FIG. 4, a wireless remote control 236 includes a remote control body 238 that fits within a user's hand. Remote control body 238 may be formed with conventional manufacturing methods and can be formed of a desired shape and of a suitable plastic material. In one arrangement, wireless remote control 236 is provided and is adapted to interface electrically with a keyboard 200'. In another arrangement, wireless remote control 236 is configured to draw electrical power from keyboard 200'. In yet another arrangement, wireless remote control 236 including control body 238 is adapted to be physically coupled and uncoupled to provide removability with a keyboard 200'.

It should be recognized that a plurality of keys or buttons are provided to operate the functions of the remote control 236. Remote control 236 includes a remote control circuitry 237 that is configured with hardware and software, which provides for the remote 236 to recognize which button/key is activated. Source control 239, Navigation control 241, A/V Control 243, Numeric keypad 245, and Transport control 247 have similar functions as previously described with respect to the keyboard shown in FIG. 3 and are operatively coupled to remote control circuitry 237. Remote control circuitry 237 includes a microprocessor as known in the art for operating on electrical input. Remote control circuitry 237 is operatively connected to a transmitter 250, and memory 252. The remote memory 252 may be a programmable type in which nonvolatile storage can be electrically erased and reprogrammed. Further, remote control 236 includes a mobile power source 256 for providing electrical power via one or more batteries and the like.

Transmitter 250 is also operatively coupled to remote control circuitry 237 to transmit signals via an antenna 254. The signals are received by the host computer 100 or other electronic equipment, which is enabled to receive and process wireless signals. For example, some other electronic equipment may be a television, digital video recorded, and the like.

Figure 5:
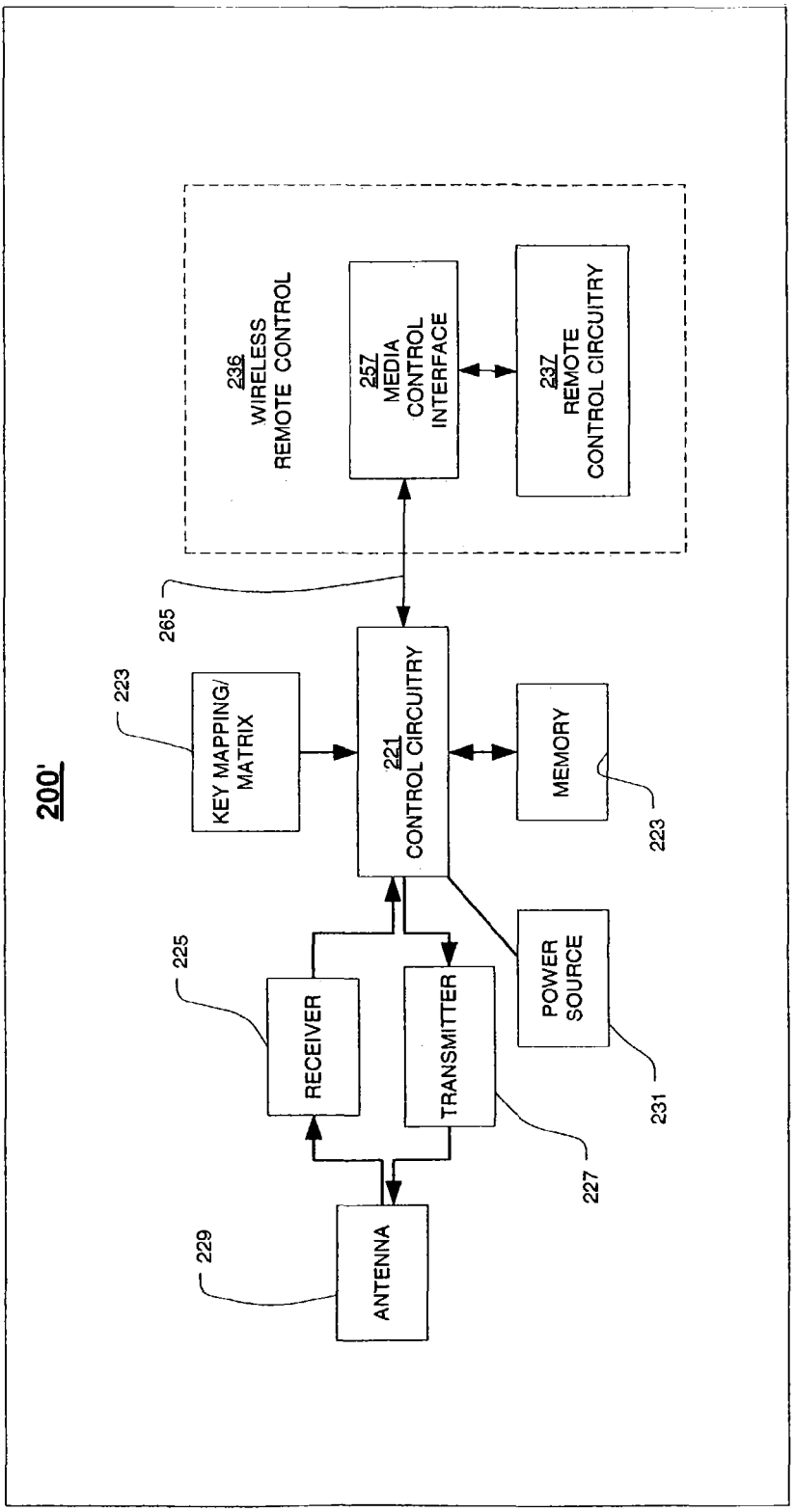
FIG. 5 is a functional block diagram of the keyboard coupled to a remote control shown in FIG. 4 according to an embodiment of the present invention.

With reference to FIG. 5, in one arrangement, remote control 236 is electrically coupled to keyboard circuitry 221. Data generated at the key of remote control 236 is transmitted by the keyboard 200', rather than transmitter 250 and antenna 254. In one embodiment, remote control 236 may be removably coupled via a signal interface connection 265 with keyboard 200' to provide electrical coupling and physical connections to keyboard 200'. Keyboard 200' may be electrically coupled to remote control 236 by way of a bus type arrangement for bidirectional signaling and communications. In a bus type arrangement, data generated at the remote control 236 is transferred and processed by the keyboard control circuitry 221. This arrangement allows for faster processing of generated signals of the remote control 236. Alternatively, keyboard 200' may be electrically coupled to remote control 236 by way of a serial type connection. In these arrangements to provide mateable electrical connections, conventional male and female electrical connectors can be used for physical metal-to-metal contact to transmit electrical data signals. Functionally, when physical mating occurs, a connector of remote control 236 is sensed by keyboard circuitry 221. Advantageously, data generated by the keys of remote control 236 is processed by remote control circuitry 237 and transferred to the keyboard circuitry 221. Thus, when the remote control 236 is electrically coupled to keyboard circuitry 221, data generated at the key of remote control 236 is transmitted by the keyboard 200', rather than transmitter 250 and antenna 254. It should be recognized that any conventionally appropriate electrical connectors for electrical signaling configuration may be used.

In one coupling arrangement, referring to FIGS. 4 and 5, remote control 236 may optionally include a media control interface 257 (shown in dotted lines in FIG. 4) which is configured cooperate with signal interface connection 265 of control circuitry 221 of keyboard 200'. For ease of explanation, FIG. 5 shows in dotted lines, wireless remote control 236 with remote control circuitry 237 and the optional media control interface 257. It should be recognized that other features shown in FIG. 4 are not shown for clarity, but are nevertheless operatively connected to remote control circuitry 237. Thus, in FIG. 5, electrical signals generated by the Source control 239, Navigation control 241, A/V Control 243, Numeric keypad 245, and Transport control 247 are processed by the remote control circuitry 237 and transferred to media control interface 257.

Media control interface 257 in conjunction with keyboard control circuitry 221 may be embodied in the numbers of formats to provide electrical and logical coupling. In one example, media control interface 257 may be a component of a Universal Serial Bus (USB) connection. The USB standard has wide spread use for connecting peripherals to computers. In this example, the control circuitry 221 may include the software to operate with the USB standard. In one embodiment, this Universal Serial Bus can be the Universal Serial Bus-On-the-GO (USB-OTG) standard configured for portable device-to-device communications without a general purpose computer. This implementation is useful in that USB-OTG has low power consumption of about 8 milliamps to preserve the battery operating life. In an USB-OTG implementation, using a topology of host/peripheral, the control circuitry 221 of keyboard 200' acts as a host device and wireless remote control 236 becomes a peripheral device to the keyboard 200'. Further, data transfer with the USB-OTG allows symmetric bi-directional communications between connected devices. In accordance with an embodiment, wireless remote control 236 can send key input data to keyboard 200'. If desired, keyboard 200' may send data to remote control 236 for data control purposes. Nevertheless, other implementations for the media control interface are possible.

In another coupling arrangement, remote control 236 electrical power is drawn from the keyboard power source 256, instead of power source 256 of the remote control. Functionally, when physical mating occurs, a connector of remote control 236 is sensed by keyboard circuitry 221. Power from the power source 256 is temporarily disconnected via a switching arrangement. Advantageously, battery power of the remote control 236 is conserved. This feature can be implemented in a number of ways. For example, in an USB-OTG configuration, battery power may be drawn from the host device instead of the peripheral device. That is, keyboard 200' serves as a host device and remote is peripheral device.

Figure 6:
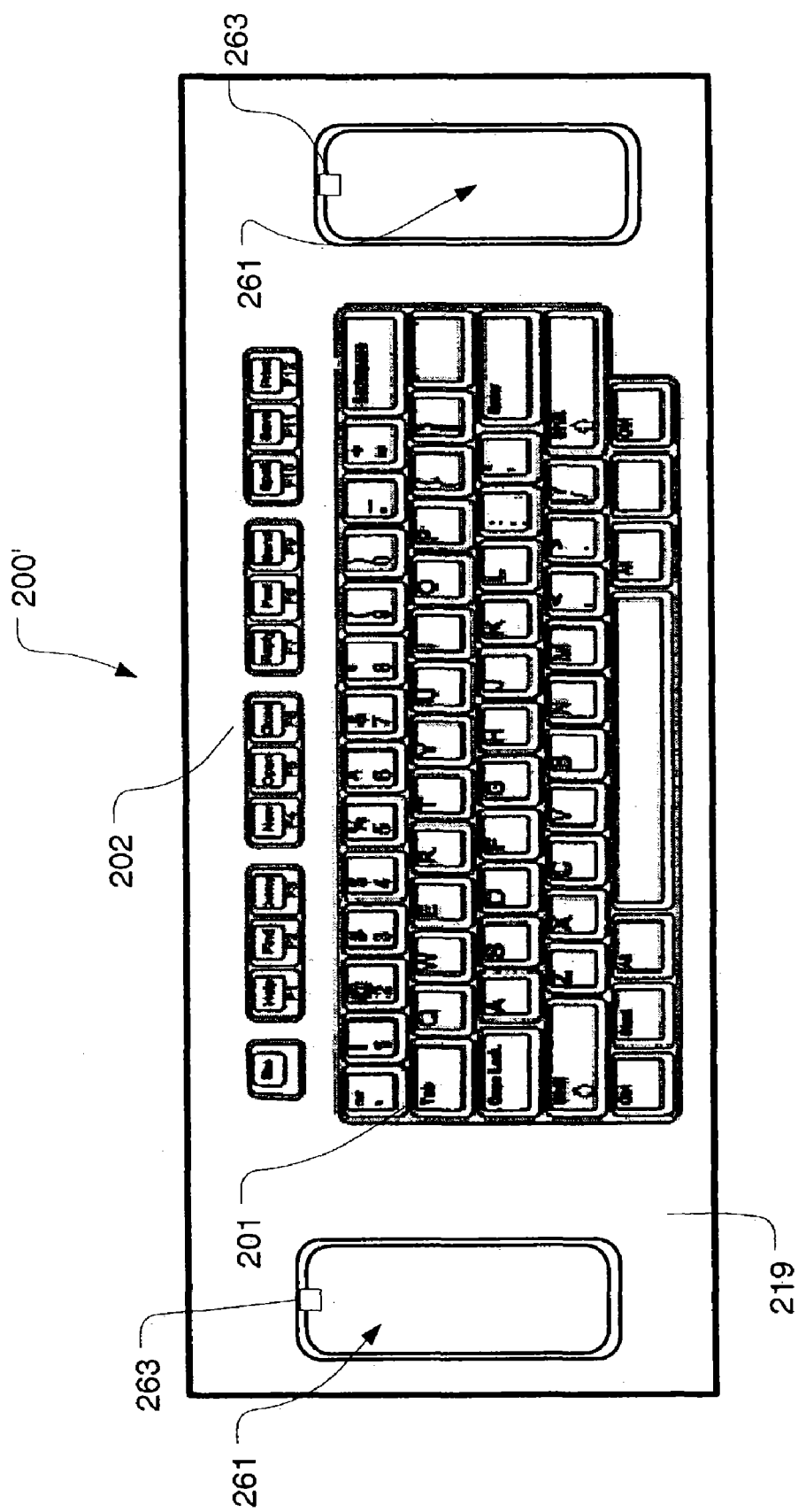
FIG. 6 is a schematic representation of a keyboard which operates with the remote control of FIG. 4 according to an embodiment of the present invention.
Figure 7:
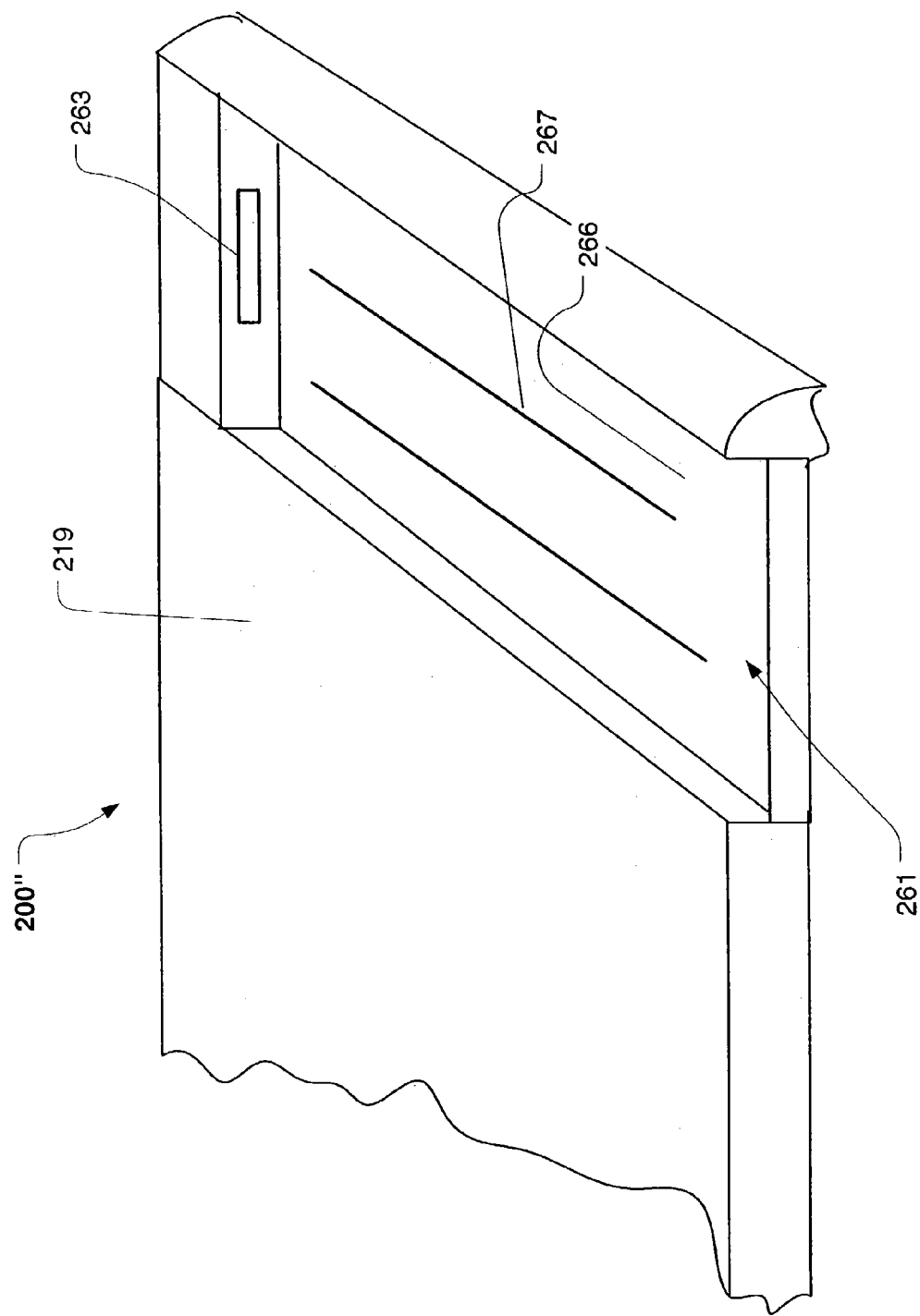
FIG. 7 is a schematic representation of a keyboard which operates with the remote control of FIG. 4 according to an embodiment of the present invention.
Figure 8:
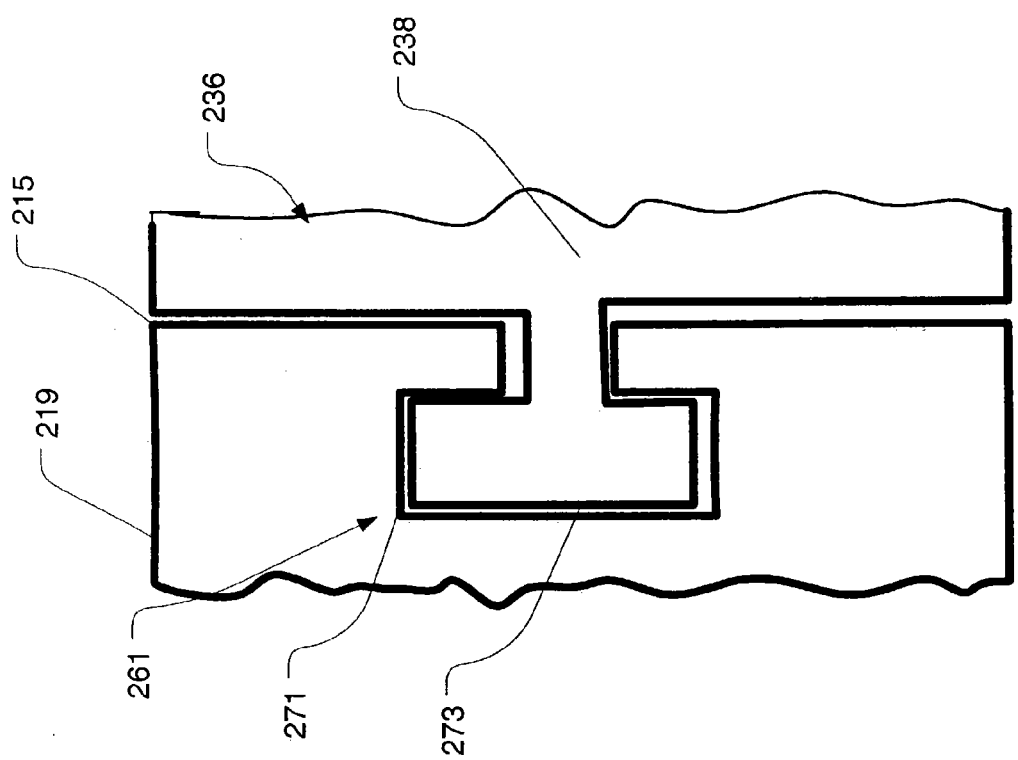
FIG. 8 is a schematic representation of a keyboard coupling arrangement the remote control of FIG. 4 according to an embodiment of the present invention.

In an embodiment to provide physical removable coupling, with reference to FIGS. 6–8, keyboard 200' or keyboard 200" includes a receiving portion 261 which is the part of the keyboard housing 219. Receiving portion 261 is designed to receive and retain wireless remote control 236 therein. Receiving portion 261 can enable connection to the keyboard control circuitry 221 shown in FIG. 5 via connector 263. The remote control 236 may be mateably disposed to the keyboard housing 219 and to the keyboard processor. In one configuration, the media control interface 257 may be formed as an electrical connector designed to mate with signal interface connection 265 formed as complementary connector 263 of the keyboard 200'. It should be recognized that connector 263 includes electrical connections to the control circuitry 221 as shown in FIG. 5. Connection 265 may be within the receiving portion 261 or at a proximate distance from the receiving portion 261. In one example, the connector arrangement may be a USB or mini-USB connecting standard. With the USB-OTG standard, the connectors can be provided for the smaller form factor for portable devices. The connector 263 may have a communication cable with the connector 263 at a device end (remote control 236) and the other end attached to the keyboard 200'. Alternatively, the connector 263 may be stationary or mounted to the keyboard 200'. Nevertheless, the media control interface 257 and signal interface connection 265 may be of other shapes or designs for the intended use for physical removable coupling including and electrically connecting the remote control 236 and keyboard 200'.

In one arrangement, shown in FIG. 6, keyboard 200' with keyboard housing 219 includes receiving portions 261 formed as cavities or recesses on the right side or left side of the keyboard. This arrangement can easily accommodate left-handed or right-handed users. In this arrangement, the user places the remote control 236 within the recesses or cavities of receiving portion 261. It should be recognized that keys of the remote control 236 are placed in an operational position so as to be accessible by the user. If desired, receiving portion 261 may be solely disposed on the right side or left side of the keyboard 200'. In another arrangement, remote control 236 may be slidably attached or otherwise coupled to the right side or left side of a keyboard. In one arrangement shown in FIG. 7, receiving portion 261 may include a base 266, and one or more grooves 267 for slidably guiding the remote control 236 to mate with a connector 263. In these configurations, remote control body 238 is in an abutment relationship with keyboard housing 219.

Figure 10:
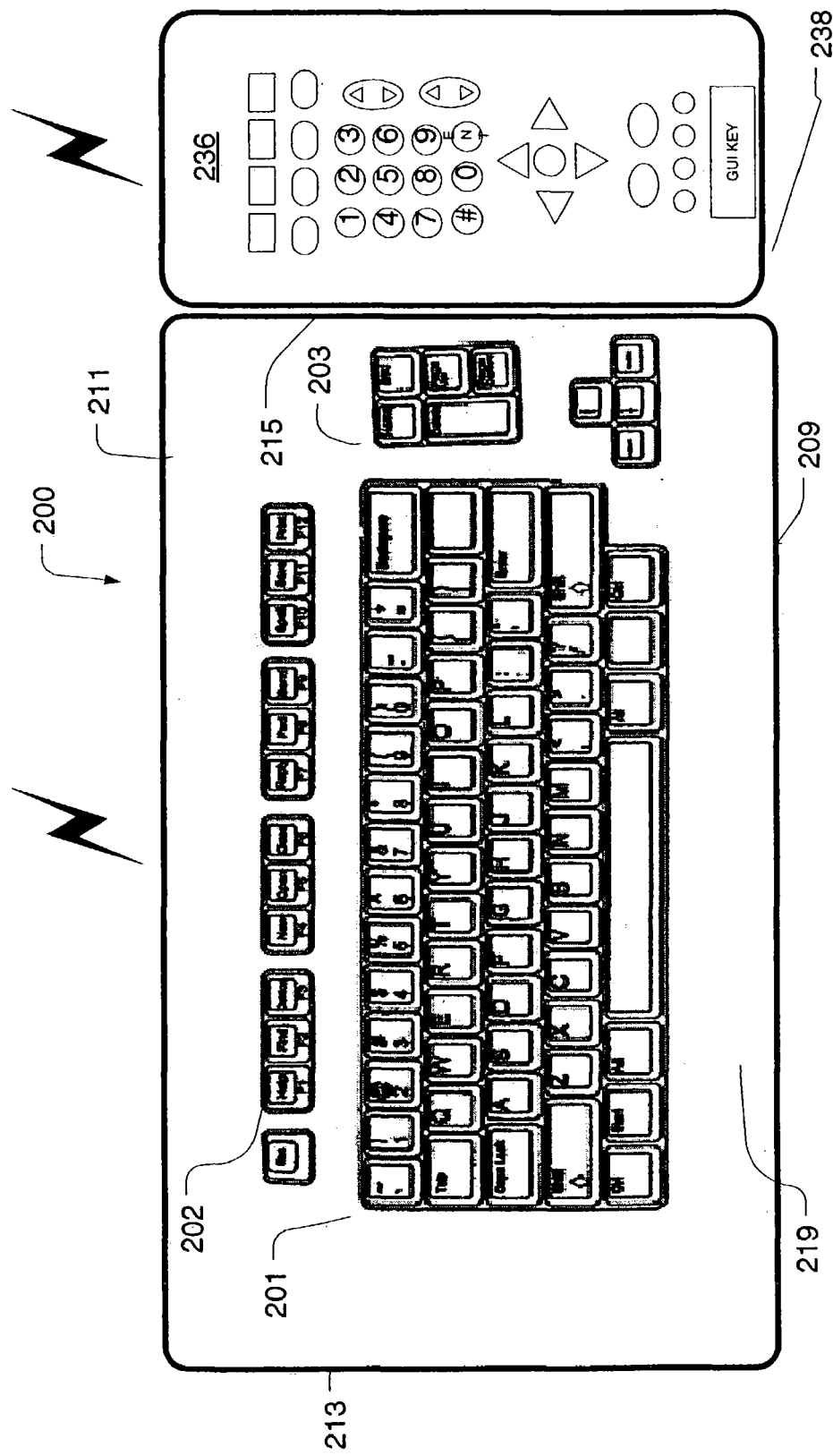
FIG. 10 is a schematic representation of a keyboard which operates with the remote control of FIG. 4 with a keyboard coupling arrangement shown in FIG. 8 according to an embodiment of the present invention.

In another arrangement shown in FIGS. 8 and 10, an edge such as, the left edge 213 or right edge 215 of the keyboard may include a receiving portion 261 formed as a groove 271 recessed within the keyboard housing 219. Remote control body 238 may include a complementary tongue or protrusion portion 273 which is configured to slidably mate within the groove 271 of the keyboard via an interference fit or a friction fit. In this tongue and groove arrangement, remote control 236 will be in a cantilevered arrangement such that the user can grasp the remote control body 238 with their hand. This action may cause the some weight of the keyboard to be supported by the tongue and groove connection. Nevertheless, it is recognized that the size of tongue and groove can be adjusted to accommodate the weight characteristics. It should be recognized that the shape of the groove 271 or tongue 273 can be virtual any appropriate shape for the intended use. For example, tongue 273 may have a rounded bulbous sectional shape and groove 271 could be formed with complementary curved surfaces. Further, remote control body 238 may be attached or otherwise removably coupled to keyboard housing 219 by way of a snap-fit arrangement. Thusly, remote control body 238 can be removably coupled with keyboard housing 219 in a number of ways. In these edge attachment configurations, the antenna 254 may be exposed for transmitting signals to the device being controlled. One such edge arrangement is shown in FIG. 10. Advantageously, in an infrared red (IR) transmission arrangement of remote control 236, the line of sight can be maintained to the device under control. If desired, media control interface 257 may attach to the keyboard via an appropriate electrical connector as previously described.

With reference to FIGS. 4 and 5, in operation, when the remote control 236 is connected to the control circuitry 221 (see FIG. 5), remote control circuitry 237 disables transmission of key codes or scan code signals to the transmitter 250 and routes those signals to media control interface 257. Thus, electrical signals generated by the Source control 239, Navigation control 241, A/V Control 243, Numeric keypad 245, and Transport control 247 are processed by the remote control circuitry 237 and transferred to media control interface 257. With reference to FIG. 5, Interface 257 passes this electrical information, such as scan codes and the like; to control circuitry 221 of keyboard 200'. The electrical information is then forwarded to the transmitter 227 and antenna 229 and transmitted to the host computer 100 or other electrical device. Thus, keyboard 200' can retain the remote control 236 for storage, allows for the user to manipulate the remote control 236 and ease of operation of new media technologies. In particular, keyboards designs in accordance with an embodiment allows user interaction for manipulating the GUI for the new media technologies and productivity activities, such as creation and modification of electronic documents, spreadsheets, database fields, drawings, photos and the like.

If desired, the keyboards 200, 200', 200" may have other group of keys or buttons for various functions. For example, there may be a pair of keys for Application Switching; a pair of keys for Copy and Paste; a pair of keys for Forward and Back; a pair of keys for Redo and Undo; a Key for Zooming. In a further arrangement, keyboard 200 can have an audio control section having a set of audio control keys, such as Command/Dictate On/Off, Microphone On/Off, Speech Correction On/Off, and the like. In another arrangement, the keyboards may have a telephony section having a set of keys, such as take call, transfer call, speaker phone, hold, conference call and the like.

It is contemplated that the various keyboard configurations and arrangements are possible. For example, keyboard 200, 200' and 200" may be a foldable or clam shell configuration. In one illustrative example shown in FIGS. 11A–11C, a keyboard 300 includes a clam shell configuration. In an arrangement shown in FIG. 11A, the keyboard 300 has two housing members or case members for the retaining components, e.g., a housing member 302 for a left portion 306 of the alphanumeric section and an opposing housing member 304 for a right portion 308 of the alphanumeric section and remote control portion 310. Housing members 302 and 304 are hingely connected via hinge 312. Housing members 302 and 304 are lockable into several positions. It should be understood that hinge 312 generally bisects center of the keyboard 300 for adapting connection to housing member 302 and housing member 304. In a first position shown in FIG. 11A, keyboard 300 is used in a normal typing mode in operation for a user. A user may then fold or otherwise convert the keyboard 300 into foldable position for transport or storage. Accordingly, as shown in FIG. 11B, the housing members 302 and 304 may be released from each other and rotated towards each other into an intermediate position. As shown in FIG. 11C, the housing members 302 and 304 are mated together enclosing the right and left portions of the alphanumeric section and remote control section. Nevertheless, they are a number of other configurations possible.

Summary

Thus, a computer keyboard or a remote control is configured for navigation of a graphical user interface of host computer. Aspects and features enable users to enjoy experiences of rich digital media, or gaming with a computer system and navigate the Internet, send and receive electronic mail messages or Instant Messaging, run electronic spreadsheets, create electronic documents and presentations with ease of operation in a new media environment.

Although the invention has been defined using the appended claims, these claims are exemplary in that the invention may be intended to include the elements and steps described herein in any combination or sub combination. Accordingly, there are any number of alternative combinations for defining the invention, which incorporate one or more elements from the specification, including the description, claims, and drawings, in various combinations or sub combinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It may be intended that the written description of the invention contained herein covers all such modifications and alterations.

What is claimed is:

1. A wireless computer keyboard configured for wireless communication with a computer, comprising:
   a keyboard housing;
   a keyboard processor disposed within the housing;
   an alphanumeric section included with the housing, the alphanumeric section including a group of alphanumeric keys being operatively connected to the keyboard processor; and
   a remote control portion configured to operate a graphical user interface, the remote control portion being disposed laterally from the alphanumeric section and having a plurality of remote control keys including a first cluster of transport control keys, a second cluster of source control keys, and a graphical user interface key, the remote control keys for being in electrical communication with the keyboard processor; wherein the remote control portion is mateable with the keyboard housing, and the keyboard processor is mateable with the remote portion for bidirectional communications.

2. The computer keyboard in accordance with claim 1, wherein the remote control portion is removably coupleable with the keyboard housing via a media control interface configured to receive input from the remote control keys.

3. The computer keyboard in accordance with claim 2, wherein the remote control portion includes a control processor, which receives input from said remote control keys and transfers said input to the keyboard processor.

4. The computer keyboard in accordance with claim 1, wherein the remote control portion includes a control processor for receiving input from a key of the set of remote control keys.

5. The computer keyboard in accordance with claim 1, wherein the remote control portion includes a control processor, which receives input from said remote control keys and transfers said input to the keyboard processor.

6. The computer keyboard in accordance to claim 1, wherein the remote control portion is adapted to attach to the keyboard housing in a groove.

7. The computer keyboard in accordance to claim 1, wherein the remote control portion is adapted to attach to the keyboard housing in a receiving slot.

8. The computer keyboard in accordance to claim 1, wherein the keyboard housing is formed with mating case members and wherein the remote control portion is adapted to attach to one of the case members.

9. The computer keyboard in accordance with claim 1, wherein the remote control portion includes a housing in an abutment relationship with the keyboard housing.

10. The computer keyboard in accordance with claim 1, wherein the remote control portion includes a control processor, which receives input from said remote control keys and transfers said input to the keyboard processor.

11. The computer keyboard in accordance with claim 1, in which the keyboard housing further includes at least two opposing housing members being hingedly attached.

* * * * *